(12) United States Patent
Ferreyra Tello

(10) Patent No.: US 11,090,721 B2
(45) Date of Patent: Aug. 17, 2021

(54) METHOD FOR MODIFYING THE DIMENSIONS OF A CAST IRON PUMP PART

(71) Applicant: Fluid Handling LLC, Morton Grove, IL (US)

(72) Inventor: Everaldo Ferreyra Tello, Hoffman Estates, IL (US)

(73) Assignee: FLUID HANDLING LLC, Morton Grove, IL (US)

( * ) Notice: Subject to any disclaimer, the term of this patent is extended or adjusted under 35 U.S.C. 154(b) by 359 days.

(21) Appl. No.: 16/020,375

(22) Filed: Jun. 27, 2018

(65) Prior Publication Data

US 2019/0030609 A1 Jan. 31, 2019

Related U.S. Application Data

(60) Provisional application No. 62/525,393, filed on Jun. 27, 2017.

(51) Int. Cl.
| | |
|---|---|
| *B22F 7/08* | (2006.01) |
| *C22C 37/08* | (2006.01) |
| *B33Y 10/00* | (2015.01) |
| *B22F 10/20* | (2021.01) |
| *B33Y 80/00* | (2015.01) |

(52) U.S. Cl.
CPC .............. *B22F 7/08* (2013.01); *B22F 10/20* (2021.01); *B33Y 10/00* (2014.12); *B33Y 80/00* (2014.12); *C22C 37/08* (2013.01); *B22F 2301/15* (2013.01); *C21D 2221/00* (2013.01)

(58) Field of Classification Search
CPC ...... B22F 7/08; B22F 3/1055; B22F 2301/15; C22C 37/08; B33Y 10/00; B33Y 80/00; C21D 2221/00; Y02P 10/25
See application file for complete search history.

(56) References Cited

U.S. PATENT DOCUMENTS

| | | |
|---|---|---|
| 4,575,330 A | 3/1986 | Hull |
| 7,500,555 B1 | 3/2009 | Liao |
| 7,854,885 B2 | 12/2010 | Illston |
| 8,021,138 B2 | 9/2011 | Green |
| 8,029,501 B2 | 10/2011 | Miller |
| 8,452,440 B2 | 5/2013 | Illston |
| 8,986,604 B2 | 3/2015 | Green |
| 9,314,972 B2 | 4/2016 | Green |
| 9,352,421 B2 | 5/2016 | Illston |
| 9,450,311 B2 | 9/2016 | Ng et al. |

(Continued)

*Primary Examiner* — Rebecca Janssen
(74) *Attorney, Agent, or Firm* — Ware, Fressola, Maguire & Barber LLP

(57) ABSTRACT

A method for modifying a dimension of a cast iron pump part features placing a cast iron pump part on a base plate of a directed energy deposition (DED) machine; selecting a metal deposition procedure for depositing a metal having a combination of one or more Nickel Alloys or Nickel powders on the cast iron pump part; and depositing the metal on the cast iron pump part to modify the dimension of the cast iron pump part, based upon the metal deposition procedure selected. The selecting of the metal deposition procedure includes forming the metal by mixing metal powders that include a Nickel Alloy "A" in a specified mixed ratio with a pure Nickel powder "B" for depositing on the cast iron pump part.

26 Claims, 2 Drawing Sheets

Direct Energy Deposition layout pattern

(56) References Cited

U.S. PATENT DOCUMENTS

| | | | |
|---|---|---|---|
| 9,522,426 B2 | 12/2016 | Das et al. | |
| 9,884,455 B2 | 2/2018 | Huang et al. | |
| 9,937,665 B2 | 4/2018 | Dudley | |
| 2004/0009089 A1* | 1/2004 | Liu | B33Y 70/00 419/38 |
| 2004/0230117 A1 | 11/2004 | Tosaya et al. | |
| 2006/0165973 A1* | 7/2006 | Dumm | C23C 28/00 428/323 |
| 2007/0084839 A1 | 4/2007 | Zhang et al. | |
| 2009/0081066 A1 | 3/2009 | Illston | |
| 2011/0256416 A1 | 10/2011 | Brancher et al. | |
| 2012/0041428 A1 | 2/2012 | Miller | |
| 2015/0060042 A1 | 3/2015 | Shilpiekandula et al. | |
| 2015/0174822 A1 | 6/2015 | Huang et al. | |
| 2016/0158842 A1 | 6/2016 | Urbanski et al. | |
| 2016/0175934 A1 | 6/2016 | Lacy et al. | |
| 2016/0251965 A1 | 9/2016 | Henderkott et al. | |
| 2016/0298213 A1 | 10/2016 | Yang et al. | |
| 2017/0021565 A1 | 1/2017 | Deaville | |
| 2017/0184108 A1 | 1/2017 | Scancarello et al. | |
| 2017/0028631 A1 | 2/2017 | Hyatt et al. | |
| 2017/0057014 A1 | 3/2017 | Illston et al. | |
| 2017/0121798 A1 | 5/2017 | Tuffile et al. | |
| 2017/0182561 A1 | 6/2017 | Scancarello et al. | |
| 2017/0182595 A1 | 6/2017 | Nelson et al. | |
| 2017/0225403 A1 | 8/2017 | Welch et al. | |
| 2017/0261087 A1 | 9/2017 | White et al. | |
| 2017/0287685 A1 | 10/2017 | Ferrasse et al. | |
| 2017/0312821 A1 | 11/2017 | Defelice et al. | |
| 2018/0080514 A1* | 3/2018 | Chung | F16D 65/123 |

* cited by examiner

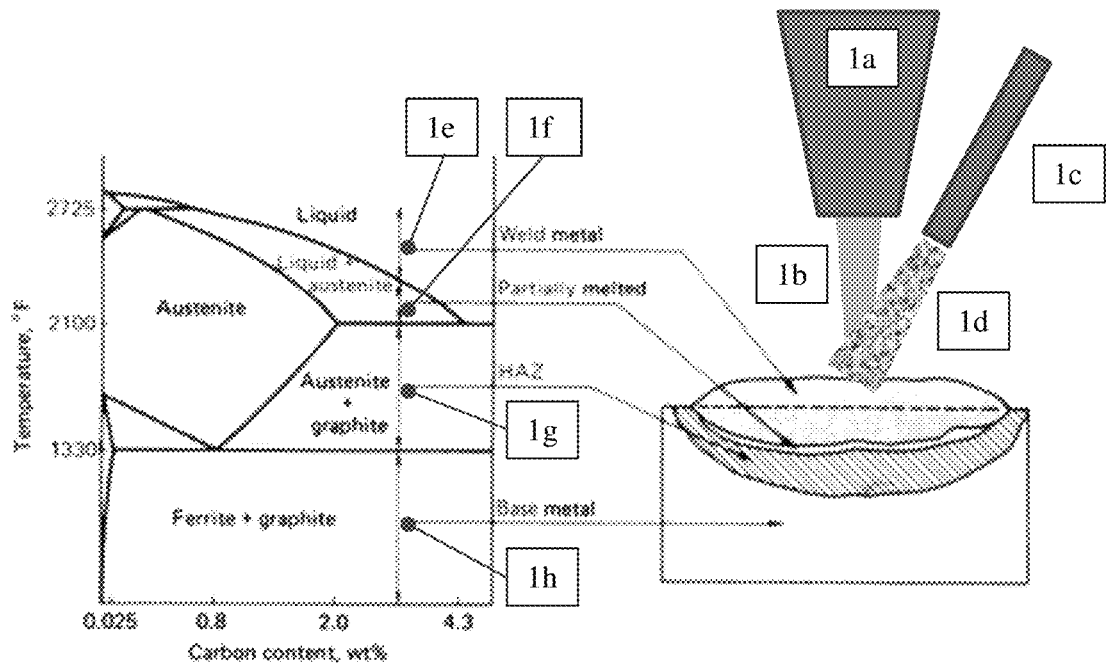
Figure 1: Typical cast iron weldment zones and the metallurgical phase transitioning experienced upon solidification.
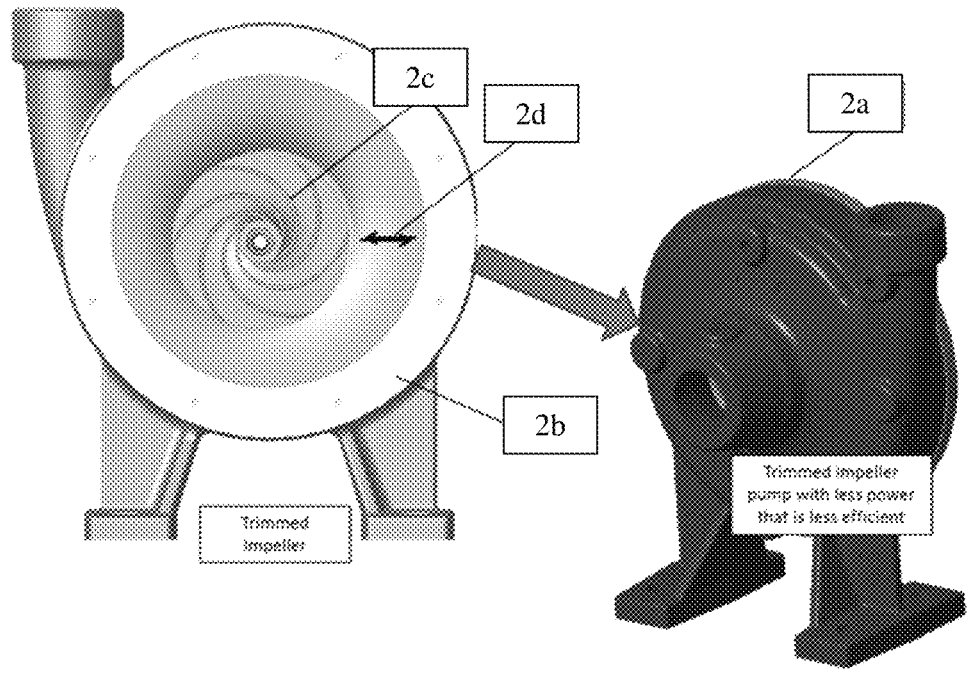
Figure 2: Typical centrifugal pump with a trimmed impeller, which increases the volume of the volute section thus reducing pump efficiency.

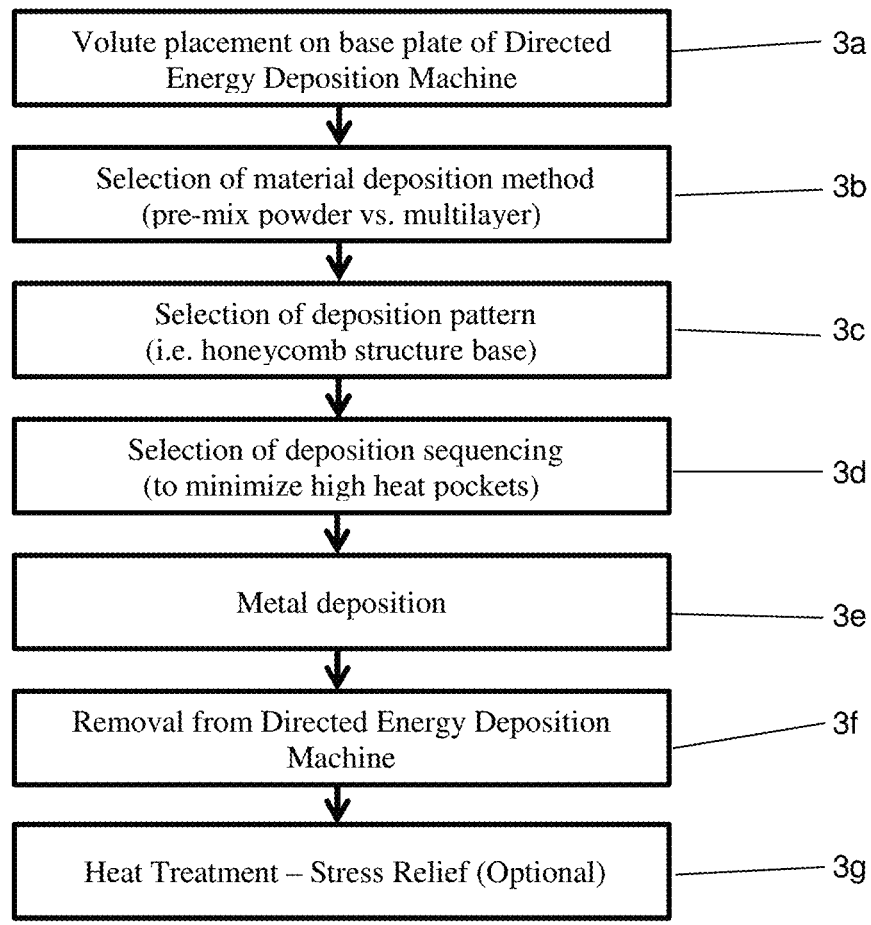
Figure 3: Flow diagram for deposition of metal on a gray cast iron pump volute.
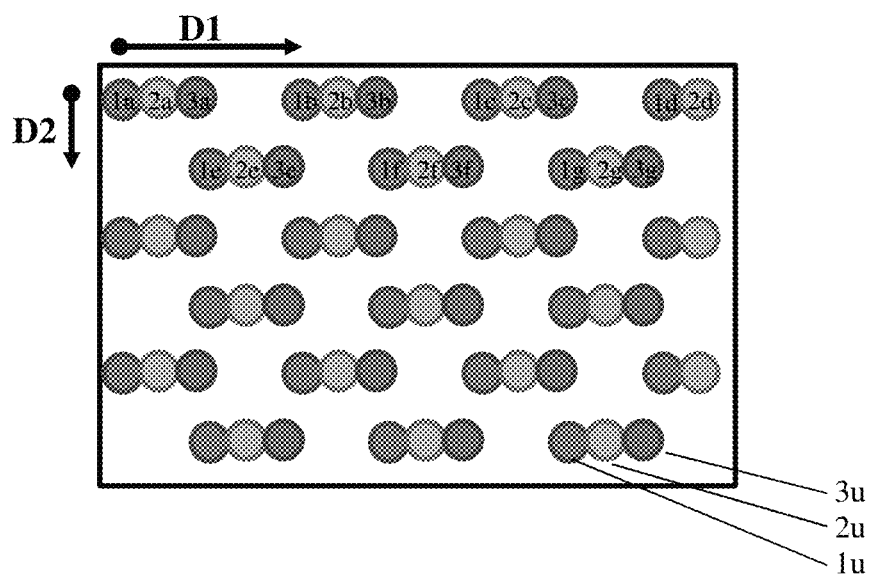
Figure 4: Direct Energy Deposition layout pattern

METHOD FOR MODIFYING THE DIMENSIONS OF A CAST IRON PUMP PART

CROSS-REFERENCE TO RELATED APPLICATION

This application claims benefit to provisional patent application Ser. No. 62/525,393, filed 27 Jun. 2017, which is hereby incorporated by reference in its entirety.

This application also relates to patent application Ser. No. 15/966,706, filed 30 Apr. 2018, entitled "Technique to improve the performance of a pump with a trimmed impeller using additive manufacturing," claiming benefit to provisional application Ser. No. 62/491,325, filed 28 Apr. 2017, which are both hereby incorporated by reference in their entirety.

BACKGROUND OF THE INVENTION

1. Field of the Invention

The present invention relates to a technique for modifying the dimensions of a cast iron pump part.

2. Brief Description of Related Art

Additive manufacturing techniques such as directed energy deposition are becoming more readily available for functional part applications; such as manufacturing complex components for high demanding applications. For example, additive manufacturing is used to manufacture injectors for rocket systems, medical prosthesis, and more.

The ability for additive manufacturing technologies to build structures in free form, allow flexibility on achieving solutions for complex designs not possible with conventional manufacturing methods. In particular, one of the technologies for additively manufacturing products known as directed energy deposition offers the potential to repair or modify structures that have been pre-manufactured by conventional methods. This technology allows for direct deposition of molten metal when metal in the form of powder or wire is fed through a nozzle or gun and is melted with the use of a high power laser.

One way directed energy deposition can be used is in the pump industry as follows:

Hydraulic pumps are conventionally designed to match specific performance requirements of water transport systems. Pump operation and hydraulic performance highly depend on components that are carefully designed to optimize the efficiency of the pump. However, limitations offered by conventional manufacturing methods often lead to constraints in design flexibility and pump inefficiencies. Additive manufacturing can then be used to optimize design of casted parts.

Some shortcomings of the known devices include the following:

Additive manufacturing techniques such as directed energy deposition can be used to modify wrought metal parts. However, deposition of metals on cast iron could be challenging due to the potential for cracking due to thermal effects, built internal stresses, metallurgical discontinuities, chemistry and other. In specific, cast iron is characterized by high levels of carbon (typically 2-4% for grey iron) that precipitates in the form of brittle carbides or graphite in various form and distribution configurations. The redistribution of carbon and microstructural changes taking place during molten metal deposition in turn result in cracking.

Directed energy deposition could overcome problems encountered in cast components; for example:

Manufacturing techniques for some common pump components often present constrains for incorporating geometrical features and limit component size availability to match specific operation requirements of the pump. This in turn, could affect pump efficiency and/or limit the number of pump operation range offerings for customers. Pump companies will often extend the operation range of the pumps by trimming impellers but this affects the pump efficiency in most cases. Directed energy deposition would allow modification of cast volutes in order to improve hydraulic efficiency that may be lost when trimming impellers. However, deposition of metals on some cast iron parts could be challenging due to the potential for cracking due to thermal effects, built internal stresses, metallurgical discontinuities, chemistry and other.

In view of this, there is a need in the pump industry for a better way to modify the dimensions of a cast iron pump part.

SUMMARY OF THE INVENTION

In summary, the present invention provides new and unique methods by which cast iron components/parts can be modified by additive manufacturing; for example, to maximize hydraulic pump efficiency of trimmed impeller pumps or hard to cast geometries, while at the same time eliminating the problem of cracking that typically results from metal deposition by thermal means on cast iron.

The current invention provides methods by which metal structures can be successfully deposited on cast iron components, while eliminating the potential for cracking. These methods may include a careful selection of deposition patterns for the control of cooling rates at points of deposition with the base gray iron; while utilizing additive manufacture powders (readily available) in a mixed ratio or layer configuration.

Specific Embodiments

According to some embodiments, the present invention may take the form of a method for modifying a dimension of a cast iron pump component/part, featuring steps for:

placing a cast iron pump part on a base plate of a directed energy deposition (DED) machine;

selecting a metal deposition procedure for depositing a metal having a combination of one or more Nickel Alloys or Nickel powders on the cast iron pump part; and depositing the metal on the cast iron pump part to modify the dimension of the cast iron pump part, based upon the metal deposition procedure selected.

The pump may also include one or more of the following features:

The selecting of the metal deposition procedure may include forming the metal by mixing metal powders that include a Nickel Alloy "A" in a specified mixed ratio with a pure Nickel powder "B" for depositing on the cast iron pump part. The Nickel Alloy "A" may include a High Nickel Alloy "A" that includes Inconel® 625 or Inconel® 718 nickel-chromium-based superalloys. The specified mixed ratio of the Nickel Alloy "A" and the pure Nickel powder "B" may include percentages ranging from 50-75/25-50, including where the percentage of Nickel Allow "A" is in a range of 50-75 percent, and the percentage of the pure Nickel powder "B" is in a range of 25-50 percent.

The selecting of the metal deposition procedure may include forming the metal by mixing metal powders that include a Nickel powder "B" and a Nickel Alloy "A" at different ratios for depositing on the cast iron pump part. The different ratios may include mixtures of the Nickel powder "B" and the Nickel Alloy "A" at powder/Alloy percentages ranging from 50-75/25-50, including where the percentage of Nickel powder "B" is in a range of 50-75 percent, and the percentage of Nickel Alloy "A" is in a range of 25-50 percent.

The selecting of the metal deposition procedure may include using a multiple material layer construction that includes a Nickel power "B" and a Nickel Alloy "A", including depositing the Nickel power "B" over a grey cast iron to create a metallurgical bond with the Nickel Alloy "A".

The Nickel Alloy "A" may be a High Nickel Alloy "A".

The method may include preheating the grey cast iron of the cast iron pump part. The preheating of the grey cast iron of the cast iron pump part may include a low temperature preheating of up to 450° C. The preheating of the grey cast iron of the cast iron pump part may include a localized high temperature preheating of up to 800° C. on the skin of the surface of the grey cast iron.

The method may include selecting a low heat input deposition pattern that includes selecting a honeycomb structure. The method may include depositing the honeycomb structure using a skip pattern for depositing the metal on the cast iron pump part.

The method may include selecting a deposition sequencing procedure that includes selecting a skip pattern for depositing the metal on the cast iron pump part. The skip pattern selected may include using multiple passes that include:
- a first pass for depositing individual clusters of the metal separated by a first distance D1 along a first axis on the cast iron pump part, and depositing the individual clusters of the metal separated by a second distance D2 along a second axis on the cast iron pump part, the first axis being orthogonal to the second axis; and
- one or more skip passes for depositing one or more skip individual clusters of the metal separated by a corresponding first distance D1 along the first axis on the cast iron pump part, and depositing the one or more skip individual clusters of the metal separated by the second distance D2 along the second axis on the cast iron pump part.

The method may include removing the cast iron pump part from the DED machine.

The method may include using a heat treatment procedure for providing stress relief to the cast iron pump part, including where the heat treatment procedure may include transferring the cast iron pump part to a furnace for heat treatment.

The method may include implementing the method on cast iron pump parts that include a pump volute or a pump impeller, e.g., including a broken blade of the pump impeller or a leading edge of the pump impeller.

The method may include forming the combination from the one or more Nickel Alloys alone, the one or more Nickel powder alone, or a Nickel Alloy/powder combination.

The method may include forming the one or more Nickel alloys from Nickel mixed with one or more other elements.

According to some embodiments, the present invention may also include a cast iron pump component/part made or manufactured using the steps in the method set forth above.

The cast iron pump component/part may also include one or more of the features set forth herein.

BRIEF DESCRIPTION OF THE DRAWING

The drawing, which is not necessarily drawn to scale, includes the following Figures:

FIG. 1 is a diagram of typical cast iron weldment zones and the metallurgical phase transitioning experienced upon solidification.

FIG. 2 shows a typical centrifugal pump with a trimmed impeller, e.g., that increases the volume of the volute section thus reducing pump efficiency.

FIG. 3 is a flow diagram for deposition of metal on a grey cast iron pump part, e.g., such as a pump volute, according to some embodiments of the present invention.

FIG. 4 is a diagram of a directed energy deposition layout pattern.

Similar parts or components in Figures are labeled with similar reference numerals and labels for consistency. Every lead line and associated reference label for every element is not included in every Figure of the drawing to reduce clutter in the drawing as a whole.

DETAILED DESCRIPTION OF THE INVENTION

Deposition of metal on cast iron by thermal means, such as the case with directed energy deposition, has similar challenges of those encountered by hard-to-weld metals. Some types of cast irons, such as gray iron typically used for pump casing manufacturing, are difficult to weld because of its high carbon content, the complex metallurgical phases formed, and the stresses generated during solidification and cooling. FIG. 1 illustrates the metallurgical phase changes undergone by cast iron upon solidification from a molten state during a directed energy deposition process (FIG. 1 is adapted from ASM Specialty Handbook: Cast Irons, Joseph R. Davis, p. 217). Sub-portions labelled 1a through 1d of FIG. 1 illustrate or identify one of several forms of a directed energy deposition known as a laser metal deposition. Sub-portion 1a shows or identifies the laser beam shielding nozzle. Sub-portion 1b shows or identifies the laser beam. Sub-portion 1c shows or identifies the powder feed nozzle (which could also be a wire feed). Sub-portion 1d shows or identifies the metal being delivered, e.g., in this case powder.

Sub-portions 1e through 1h of FIG. 1 show a standard carbon-iron phase diagram and the zones observed at the temperatures reached by: the molten metal particles being deposited, the base cast iron, and the transition zone. Sub-portion 1e shows or identifies the condition of molten metal when deposited at extremely high temperatures. Sub-portion 1f shows or identifies the region adjacent to the deposited molten metal. This is formed by a mixture of partially molten metal and solid metal in the austenitic phase. This phase further transforms into other constituents upon cooling, depending on cooling rates. Sub-portion 1g shows or identifies a region where no fusion of metal occurs, but heat transfer from the molten metal causes a phase transformation of the ferrite in the cast iron base metal structure into austenite. This zone is typically defined as the heat affected zone (HAZ) and could form other micro-constituents upon cooling to room temperature. Sub-portion 1h shows or identifies the main structure of the base metal, cast iron, most commonly being ferrite with graphite or a ferrite/pearlite mix with graphite.

Cracking potential for welding processes is often correlated to chemistry of alloying elements. Typical high carbon contents on gray irons range from 2-4%, which leads to formation or hard brittle phases. However, other elements can also have an effect on brittleness or susceptibility for cracking. The parameter calculated to determine propensity to cracking is defined as Carbon Equivalent or CE. The following formula determines the CE for specifically for cast iron alloy is:

$$CE=C+0.31Si+0.33P+0.45S-0.028Mn+(Mo+Cr-0.02Ni-0.01Cu)*$$

*Applies for castings where molybdenum, chromium Nickel and Copper does not exceed 1.5%

Susceptibility for cracking is expected to be greater for higher CE values. Nickel would generally have a beneficial effect on mitigating cracking susceptibility as it reduces CE as shown in the equation above.

Cast iron propensity to crack not only depends on the chemistry of the base metal, but on the chemical composition of the metal being deposited, the microstructure of the base metal and the deposition process parameters. Thus, using Nickel alloys, Nickel powder, a combination thereof, or a multi-layer construction of Ni containing alloys, would suspend crack formation and prevent formation of iron carbides. This is illustrated for example, by the negative sign (−) factoring the effect of Nickel on Carbon Equivalent (CE).

One way in which deposition of metal onto cast iron components could be beneficial is by using directed energy deposition of metal on the volute portion of a casing for trimmed impeller pumps. Pumps with trimmed impellers typically have their efficiency reduced because the same volute of the full size impeller pump is used. FIG. 2 illustrates the configuration of a pump casing with an impeller that has been trimmed. FIG. 2 also shows the closed pump assembly. When the volute 2b is assembled with the trimmed impeller 2c, the volute gap 2d increases, thus, reducing the pump efficiency.

Directed energy deposition of metal on the gray cast iron volute would enable adjustment of the volute geometry to match hydraulic performance of the trimmed impeller as set forth and summarized in relation to the flow diagram of FIG. 3, which includes steps 3a, 3b, 3c through 3g.

1. In step 3a, the volute of a trimmed impeller pump is positioned and secured on a base plate of a directed energy deposition (DED) machine.

2. By way of example, the DED system may be equipped with a robotic arm that allows free deposition of metal onto the concave section of the volute volume to fill.

3. In steps 3b through 3e, metal is then deposited by one of the two methods identified below (a, b), which may include the low heat input deposition pattern (c) below.

a. Method A—Mixing Metal Powders During Build Process

High Nickel Alloy "A" (such as Inconel® 625, Inconel® 718 nickel-chromium-based superalloys, or similar) in a specified mixed ratio with pure Nickel powder "B" (with a specified level of purity) may be deposited, with the intention of reducing the carbon available for the formation of brittle phases such as carbides in the partially melt zone, and to reduce the shrinking potential causing cracks from solidification in the heat affected zone.

For example, Nickel powder "B" mixed with Nickel Alloy "A" at different ratios would allow control of the amount of brittle phase formation and stress caused from shrinkage upon solidification of the molten metal deposited. For instance, Nickel powder "B" mixed with Nickel Alloy "A" at 50-75/25-50 ratios would allow a significant amount of carbon dilution at the partially melt zone, while significantly reducing solidification cracks that result from the shrinkage of the weld. By way of example, one combination may include Nickel powder "B" mixed with Nickel Alloy "A" at 50-50 ratios. Alternatively, another combination may include Nickel powder "B" mixed with Nickel Alloy "A" at 25-75 ratios. Alternatively, still another combination may include Nickel powder "B" mixed with Nickel Alloy "A" at 75-25 ratios.

b. Method B—Multiple Material Layer Construction

Pure Nickel "B", similar to the one employed in Method A, may be deposited over grey cast iron with the intention of creating a metallurgical bond with a High Nickel Alloy "A", similar to the one employed in Method A, while eliminating the potential for cracking due to thermal shock. A similar pattern layout as described in deposition pattern below might be used, but the pure Nickel layer would also allow for faster deposition.

Preheating the grey iron would further reduce the potential for cracking. Low temperature pre-heating (up to 450° C.) could be used on the whole part where DED is intended. Alternatively, a localized higher temperature (up to 800° C.) could be used on the skin of the surface to be treated, in order to graphitize the carbon and reduce the susceptibility to form undesirable brittle phases when depositing the molten metal.

c. Metal Deposition Pattern

In order to control cracking from solidification of metal being deposited, a skip pattern for deposition may be selected as to limit deposition of large volumes of molten metal that could increase cracking susceptibility. An example of a deposition pattern to mitigate potential for cracking is shown in FIG. 4, which illustrates the deposition of individual clusters of metal separated by a distance (D1). Deposition pattern moves from points labelled 1a, 1b, 1c to the end of the desired line pattern end to 1d, and then it moves a distance (D2) to the following line until it reaches the end of the area, continuing to point 1u. A second pass having points corresponding to 2a through 2u follows adjacent to the first pass to fill the desired pattern of the first layer. A third pass having points corresponding to 3a through 3u follows adjacent to the second pass to fill the desired pattern of the second layer. By way of example, the desired pattern could include a honeycomb structure to optimize stress distribution.

d. Removal and Optional Heat Treatment

In steps 3f and 3g, the volute is removed from the DED machine and transferred to a furnace for heat treatment (optional)

List All Possible Applications

By way of example, possible applications of the present invention may include:
1. Casting part modification; and
2. Trimmed impeller volute Additive Manufacturing (AM)

As one skilled in the art would appreciate, additive manufacturing techniques now exist that will allow for material to be deposited onto the volute, or any other annular geometry's surface. One such technique is Directed Energy Deposition (DED). This technique combines a multi-axis computer controlled arm, a nozzle which will blow metal powder according to instructions from a computer, and a laser central to the nozzle which fires according to instructions from a computer to melt the blown metal powder onto the desired locations.

Techniques like DED allow a company to continue to benefit from the reduction in inventory of only having one casting for each pump size but, by adding material to the annular area of the impeller onto the casing in the appropriate areas when the impeller is trimmed, they can significantly improve the efficiency of the trimmed impeller pump. Noting the example from FIG. 2 and the 18% decrease in overall efficiency at the best efficiency point, the efficiency decreases can be substantial. Filling in the areas and matching the volute to the trimmed impeller would reduce the loss in efficiency and could potentially prevent or improve it. The exact amount would depend on many factors. See the further discussion of AM below and that shown in FIG. 1.

The principles for matching the annular geometry of an impeller to maximize the performance of a pump are well established analytically, experimentally, and numerically. The design of the filled annuli could be determined and optimized via classical methods and then, using a method that adds material to an existing structure such as DED described above, when a trimmed impeller is required its efficiency could be improved by adding material in the spaces that are necessary in order to transform the common cast pump casing (optimized for the fully sized impeller) into a modified pump casing that is optimized to match the fluid dynamics of the trimmed impeller.

Techniques for implementing additive manufacturing (AM) are known in the art, and the scope of the invention is not intended to be limited to any particular type or kind thereof either now known or later developed in the future.

The following is a brief description of techniques for implementing AM that are known in the art.

By way of example, AM is understood to be a transformative approach to industrial production that enables the creation of lighter, stronger parts and systems. It is another technological advancement made possible by the transition from analog to digital processes. In recent decades, communications, imaging, architecture and engineering have all undergone their own digital revolutions. Now, AM can bring digital flexibility and efficiency to manufacturing operations.

By way of example, AM may be implemented using data computer-aided-design (CAD) software or 3D object scanners to direct hardware to deposit material, layer upon layer, in precise geometric shapes. As its name implies, AM adds material to create an object. In contrast, when one creates an object by traditional means, it is often necessary to remove material through milling, machining, carving, shaping or other means.

Although the terms "3D printing" and "rapid prototyping" may typically be used to discuss AM, each process is actually understood to be a subset of AM in general. AM has been around for several decades. In the right applications, AM delivers a trifecta of improved performance, complex geometries and simplified fabrication. As a result, opportunities abound for those who actively embrace AM. The term "AM" references technologies that grow three-dimensional objects one superfine layer at a time. Each successive layer bonds to the preceding layer of melted or partially melted material. It is possible to use different substances for layering material, including metal powder, thermoplastics, ceramics, composites, glass and even edibles like chocolate.

By way of example, objects may be digitally defined by the computer-aided-design (CAD) software that is used to create .stl files that essentially "slice" the object into ultra-thin layers. This information guides the path of a nozzle or print head as it precisely deposits material upon the preceding layer. Or, a laser or electron beam selectively melts or partially melts in a bed of powdered material. As materials cool or are cured, they fuse together to form a three-dimensional object.

The journey from .stl file to 3D object is revolutionizing manufacturing. Gone are the intermediary steps, like the creation of molds or dies, that cost time and money. There are a variety of different AM processes, e.g., including the following:

Material Extrusion: Material extrusion is one of the most well-known AM processes. Spooled polymers are extruded, or drawn through a heated nozzle mounted on a movable arm. The nozzle moves horizontally while the bed moves vertically, allowing the melted material to be built layer after layer. Proper adhesion between layers occurs through precise temperature control or the use of chemical bonding agents.

Directed Energy Deposition (DED): The process of DED is similar to material extrusion, although it can be used with a wider variety of materials, including polymers, ceramics and metals. Consistent with that shown in FIG. 1, an electron beam gun or laser may be mounted on a four- or five-axis arm melts either wire or filament feedstock or powder. According to some embodiments, the DED process may be implemented to add the material/modifications to the volute portions, e.g., consistent with that disclosed herein, and according to some embodiments of the present invention.

Material Jetting: With material jetting, a print head moves back and forth, much like the head on a 2D inkjet printer. However, it typically moves on x-, y- and z-axes to create 3D objects. Layers harden as they cool or are cured by ultraviolet light.

Binder Jetting: The binder jetting process is similar to material jetting, except that the print head lays down alternate layers of powdered material and a liquid binder.

Sheet Lamination: Laminated object manufacturing (LOM) and ultrasonic AM (UAM) are two sheet lamination methods. LOM uses alternate layers of paper and adhesive, while UAM employs thin metal sheets conjoined through ultrasonic welding. LOM excels at creating objects ideal for visual or aesthetic modeling. UAM is a relatively low-temperature, low-energy process used with various metals, including titanium, stainless steel and aluminum.

Vat Polymerization: With vat photopolymerization, an object is created in a vat of a liquid resin photopolymer. A process called photopolymerization cures each microfine resin layer using ultraviolet (UV) light precisely directed by mirrors.

Powder Bed Fusion: Powder Bed Fusion (PBF) technology is used in a variety of AM processes, including direct metal laser sintering (DMLS), selective laser sintering (SLS), selective heat sintering (SHS), electron beam melting (EBM) and direct metal laser melting (DMLM). These systems use lasers, electron beams or thermal print heads to melt or partially melt ultra-fine layers of material in a three-dimensional space. As the process concludes, excess powder is blasted away from the object.

AM Technologies

Sintering is the process of creating a solid mass using heat without liquefying it. Sintering is similar to traditional 2D photocopying, where toner is selectively melted to form an image on paper.

Within DMLS, a laser sinters each layer of metal powder so that the metal particles adhere to one another. DMLS machines produce high-resolution objects with desirable surface features and required mechanical properties. With SLS, a laser sinters thermoplastic powders to cause particles to adhere to one another.

In contrast, materials are fully melted in the DMLM and EBM processes. With DMLM, a laser completely melts each layer of metal powder while EBM uses high-power electron beams to melt the metal powder. Both technologies are ideal for manufacturing dense, non-porous objects.

Stereolithography (SLA) uses photopolymerization to print ceramic objects. The process employs a UV laser selectively fired into a vat of photopolymer resin. The UV-curable resins produce torque-resistant parts that can withstand extreme temperatures.

AM Materials

It is possible to use many different materials to create 3D-printed objects. AM technology fabricates jet engine parts from advanced metal alloys, and it also creates chocolate treats and other food items.

By way of examples, AM materials include the following:
Thermoplastics: To date, thermoplastic polymers remain the most popular class of AM materials. Acrylonitrile butadiene styrene (ABS), polylactic acid (PLA) and polycarbonate (PC) each offer distinct advantages in different applications. Water-soluble polyvinyl alcohol (PVA) is typically used to create temporary support structures, which are later dissolved away.
Metals: Many different metals and metal alloys are used in AM, from precious metals like gold and silver to strategic metals like stainless steel and titanium. The AM process for implementing the present invention disclosed herein may include using a metal that is similar or corresponds to the metal of the full sized casing.
Ceramics: A variety of ceramics have also been used in AM, including zirconia, alumina and tricalcium phosphate. Also, alternate layers of powdered glass and adhesive are baked together to create entirely new classes of glass products.
Biochemicals: Biochemical healthcare applications include the use of hardened material from silicon, calcium phosphate and zinc to support bone structures as new bone growth occurs. Researchers are also exploring the use of bio-inks fabricated from stem cells to form everything from blood vessels to bladders and beyond.

AM Advantages

AM allows the creation of lighter, more complex designs that are too difficult or too expensive to build using traditional dies, molds, milling and machining.

AM also provides for rapid prototyping. Since the digital-to-digital process eliminates traditional intermediate steps, it is possible to make alterations on the run. When compared to the relative tedium of traditional prototyping, AM offers a more dynamic, design-driven process.

Whether AM is used for prototyping or production, lead times are frequently reduced. Lead times for certain jet engine parts have been reduced by a year or more. Also, parts once created from multiple assembled pieces are now fabricated as a single, assembly-free object.

In designing everything from bridges to skyscrapers, engineers have long sought to minimize weight while maximizing strength. With AM, designers realize the dream of utilizing organic structures to greatly reduce the weight of objects.

Advantages of using the AM process for implementing the present invention disclosed herein may include substantially improved pump efficiency when comparing the pump using the trimmed impeller with the added material according to the present invention in relation to the prior art pump disclosed in FIG. 2 which does not.

Complex Geometries

The AM technology enables engineers to design parts that incorporate complexity that is not possible using other methods. Intricate features, such as conformal cooling passages, can be incorporated directly into a design. Parts that previously required assembly and welding or brazing of multiple pieces can now be grown as a single part, which makes for greater strength and durability. Designers are no longer restricted to the limitations of traditional machines and can create parts with greater design freedom.

Pump casing typically come in two halves, and the AM process may be implementing according to the present invention to add material to the volute portions of each half.

Time Savings

AM is ideal for getting prototypes made quickly. Parts are manufactured directly from a 3D CAD file, which eliminates the cost and lengthy process of having fixtures or dies created. Plus, changes can be made mid-stream with virtually no interruption in the process.

Weight Savings

By incorporating organic structures into designs, designers can eliminate substantial weight while maintaining the part's strength and integrity.

Directed Energy Deposition (DED)

DED covers a range of terminologies, e.g., including: 'Laser engineered net shaping, directed light fabrication, direct metal deposition, 3D laser cladding'. It is a more complex printing process commonly used to repair or add additional material to existing components (Gibson et al., 2010), e.g., like pump casings.

A typical DED machine consists of a nozzle mounted on a multi axis arm, which deposits melted material onto the specified surface, where it solidifies. The process is similar in principle to material extrusion, but the nozzle can move in multiple directions and is not fixed to a specific axis. The material, which can be deposited from any angle due to 4 and 5 axis machines, is melted upon deposition with a laser or electron beam. The process can be used with polymers, ceramics but is typically used with metals, in the form of either powder or wire.

Typical applications include repairing and maintaining structural parts.

By way of example, FIG. 1 shows apparatus for implementing Directed Energy Deposition—Step by Step—as follows:

1. A 4 or 5 axis arm with nozzle moves around a fixed object.

2. Material is deposited from the nozzle onto existing surfaces of the object.
3. Material is either provided in wire or powder form.
4. Material is melted using a laser, electron beam or plasma arc upon deposition.
5. Further material is added layer by layer and solidifies, creating or repairing new material features on the existing object.

The DED process uses material in wire or powder form. Wire is less accurate due to the nature of a pre-formed shape but is more material efficient when compared to powder (Gibson et al., 2010), as only required material is used. The method of material melting varies between a laser, an electron beam or plasma arc, all within a controlled chamber where the atmosphere has reduced oxygen levels. With 4 or 5 axis machines, the movement of the feed head will not change the flow rate of material, compared to fixed, vertical deposition (Gibson et al., 2010).

Whilst in most cases, it is the arm that moves and the object remains in a fixed position, this can be reversed and a platform could be moved instead and the arm remain in a fixed position. The choice will depend on the exact application and object being printed. Material cooling times are very fast, typically between 1000-5000 degrees Celsius/second (Gibson et al., 2010). The cooling time will in turn affect the final grain structure of the deposited material, although the overlapping of material must also be considered, where the grain structure is changed as the overlapping can cause re-melting to occur, resulting in a uniform but alternating micro-structure. Typical layer thicknesses of 0.25 mm to 0.5 mm (Gibson et al., 2010).

AM Patent Documents

The following is a list of patent documents, e.g., including US patent applications and issued US patent, that disclose AM technology, are all incorporated by reference in their entirety, and include the following:

U.S. Pat. Nos. 4,575,330; 7,500,555; 7,854,885; 8,029,501; 8,021,138; 8,452,440; 8,986,604; 9,314,972; 9,352,421; 9,884,455; 9,450,311 and 9,937,665.

US Patent publication nos. 2004/0230117; 2007/0084839; 2009/0081066; 2011/0256416; 2012/0041428; 2015/0174822; 2016/0298213; 2017/0021565; 2017/0028631; 2017/0057014; 2017/0182561; 2017/0182595; 2017/0184108; 2017/0225403; 2017/0261087; 2017/0287685; and 2017/0312821.

The incorporation by reference of the aforementioned patent documents includes the incorporation by reference of all the US patent applications and issued US patent either referenced or cited therein.

The Scope of the Invention

The embodiments shown and described in detail herein are provided by way of example only; and the scope of the invention is not intended to be limited to the particular configurations, dimensionalities, and/or design details of these parts or elements included herein. In other words, one skilled in the art would appreciate that design changes to these embodiments may be made and such that the resulting embodiments would be different than the embodiments disclosed herein, but would still be within the overall spirit of the present invention.

It should be understood that, unless stated otherwise herein, any of the features, characteristics, alternatives or modifications described regarding a particular embodiment herein may also be applied, used, or incorporated with any other embodiment described herein.

Although the invention has been described and illustrated with respect to exemplary embodiments thereof, the foregoing and various other additions and omissions may be made therein and thereto without departing from the spirit and scope of the present invention.

What I claim is:

1. A method for modifying a dimension of a cast iron pump part, comprising:
   placing a cast iron pump part on a base plate of a directed energy deposition (DED) machine;
   selecting a metal deposition procedure having a skip pattern for depositing individual clusters of a metal separated by a distance (D1) having a combination of one or more Nickel Alloys or Nickel powders on the cast iron pump part; and
   depositing the metal on the cast iron pump part to modify the dimension of the cast iron pump part, based upon the metal deposition procedure selected.

2. A method according to claim 1, wherein the selecting of the metal deposition procedure comprises forming the metal by mixing metal powders that include a Nickel Alloy "A" in a specified mixed ratio with a pure Nickel powder "B" for depositing on the cast iron pump part.

3. A method according to claim 2, wherein the Nickel Alloy "A" comprises a High Nickel Alloy "A".

4. A method according to claim 2, wherein the specified mixed ratio of the Nickel Alloy "A" and the pure Nickel powder "B" includes percentages ranging from 50-75/25-50, including where the percentage of Nickel Allow "A" is in a range of 50-75 percent, and the percentage of the pure Nickel powder "B" is in a range of 25-50 percent.

5. A method according to claim 1, wherein the selecting of the metal deposition procedure comprises forming the metal by mixing metal powders that include a Nickel powder "B" and a Nickel Alloy "A" at different ratios for depositing on the cast iron pump part.

6. A method according to claim 5, wherein the different ratios include mixtures of the Nickel powder "B" and the Nickel Alloy "A" at powder/Alloy percentages ranging from 50-75/25-50, including where the percentage of Nickel powder "B" is in a range of 50-75 percent, and the percentage of Nickel Alloy "A" is in a range of 25-50 percent.

7. A method according to claim 1, wherein the selecting of the metal deposition procedure comprises using a multiple material layer construction that includes a Nickel power "B" and a Nickel Alloy "A", including depositing the Nickel power "B" over a grey cast iron to create a metallurgical bond with the Nickel Alloy "A".

8. A method according to claim 7, wherein the Nickel Alloy "A" is a High Nickel Alloy "A".

9. A method according to claim 7, wherein the method comprises preheating the grey cast iron of the cast iron pump part.

10. A method according to claim 9, wherein the preheating of the grey cast iron of the cast iron pump part includes a low temperature preheating of up to 450° C.

11. A method according to claim 9, wherein the preheating of the grey cast iron of the cast iron pump part includes a localized high temperature preheating of up to 800° C. on the skin of the surface of the grey cast iron.

12. A method for modifying a dimension of a cast iron pump part, comprising;
   placing a cast iron pump part on a base plate of a directed energy deposition (DED) machine;

selecting a metal deposition procedure for depositing a metal having a combination of one or more Nickel Alloys or Nickel powders on the cast iron pump part; and depositing the metal on the cast iron pump part to modify the dimension of the cast iron pump part, based upon the metal deposition procedure selected;

wherein the method comprises selecting a low heat input deposition pattern that includes selecting a honeycomb structure.

13. A method according to claim 12, wherein the method comprises depositing the honeycomb structure using a skip pattern for depositing the metal on the cast iron pump part.

14. A method for modifying a dimension of a cast iron pump part, comprising;

placing a cast iron pump part on a base plate of a directed energy deposition (DED) machine;

selecting a metal deposition procedure for depositing a metal having a combination of one or more Nickel Alloys or Nickel powders on the cast iron pump part; and depositing the metal on the cast iron pump part to modify the dimension of the cast iron pump part, based upon the metal deposition procedure selected;

wherein the method comprises selecting a deposition sequencing procedure that includes selecting a skip pattern for depositing the metal on the cast iron pump part.

15. A method according to claim 14, wherein the skip pattern selected comprises using multiple passes that include:

a first pass for depositing individual clusters of the metal separated by a first distance D1 along a first axis on the cast iron pump part, and depositing the individual clusters of the metal separated by a second distance D2 along a second axis on the cast iron pump part, the first axis being orthogonal to the second axis; and one or more skip passes for depositing one or more skip individual clusters of the metal separated by a corresponding first distance D1 along the first axis on the cast iron pump part, and depositing the one or more skip individual clusters of the metal separated by the second distance D2 along the second axis on the cast iron pump part.

16. A method according to claim 1, wherein the method comprises removing the cast iron pump part from the DED machine.

17. A method according to claim 1, wherein the method comprises using a heat treatment procedure for providing stress relief to the cast iron pump part, including where the heat treatment procedure include transferring the cast iron pump part to a furnace for heat treatment.

18. A method according to claim 1, wherein the method comprises implementing the method on cast iron pump parts that include a pump volute or a pump impeller, including a broken blade of the pump impeller or a leading edge of the pump impeller.

19. A method according to claim 1, wherein the method comprises forming the combination from the one or more Nickel Alloys alone, the one or more Nickel powder alone, or a Nickel Alloy/powder combination.

20. A method according to claim 1, wherein the method comprises forming the one or more Nickel alloys from Nickel mixed with one or more other elements.

21. A method according to claim 12, wherein the method comprises implementing the method on cast iron pump parts that include a pump volute or a pump impeller, including a broken blade of the pump impeller or a leading edge of the pump impeller.

22. A method according to claim 12, wherein the method comprises forming the combination from the one or more Nickel Alloys alone, the one or more Nickel powder alone, or a Nickel Alloy/powder combination.

23. A method according to claim 12, wherein the method comprises forming the one or more Nickel alloys from Nickel mixed with one or more other elements.

24. A method according to claim 14, wherein the method comprises implementing the method on cast iron pump parts that include a pump volute or a pump impeller, including a broken blade of the pump impeller or a leading edge of the pump impeller.

25. A method according to claim 14, wherein the method comprises forming the combination from the one or more Nickel Alloys alone, the one or more Nickel powder alone, or a Nickel Alloy/powder combination.

26. A method according to claim 14, wherein the method comprises forming the one or more Nickel alloys from Nickel mixed with one or more other elements.

* * * * *